United States Patent
Ishizuka et al.

(10) Patent No.: US 7,843,681 B2
(45) Date of Patent: Nov. 30, 2010

(54) SOLID ELECTROLYTIC CAPACITOR ELEMENT AND SOLID ELECTORLYTIC CAPACITOR

(75) Inventors: Hidetoshi Ishizuka, Sannohe (JP); Toshiyuki Mizutani, Sannohe (JP); Tadayuki Echigo, Sannohe (JP); Fumihiro Takahashi, Sannohe (JP)

(73) Assignee: Nichicon Corporation, Kyoto (JP)

( * ) Notice: Subject to any disclaimer, the term of this patent is extended or adjusted under 35 U.S.C. 154(b) by 430 days.

(21) Appl. No.: 12/051,698

(22) Filed: Mar. 19, 2008

(65) Prior Publication Data

US 2009/0073639 A1 Mar. 19, 2009

(30) Foreign Application Priority Data

Mar. 19, 2007 (JP) .............................. 2007-070290

(51) Int. Cl.
*H01G 9/00* (2006.01)
(52) U.S. Cl. ................ 361/523; 361/525; 361/528; 361/519; 361/540; 29/25.01; 29/25.03
(58) Field of Classification Search ................ 361/523, 361/525, 516–519, 528, 529, 540–541, 508–509; 29/25.01, 25.03
See application file for complete search history.

(56) References Cited

U.S. PATENT DOCUMENTS

| 6,246,569 | B1 * | 6/2001 | Strange et al. .............. 361/508 |
| 6,504,705 | B2 * | 1/2003 | Shimada et al. ............. 361/528 |
| 6,680,841 | B2 * | 1/2004 | Tadanobu et al. ........... 361/523 |
| 6,852,137 | B2 * | 2/2005 | Miki et al. ................. 29/25.03 |
| 6,855,177 | B2 * | 2/2005 | Fujii et al. ................. 29/25.03 |
| 7,247,178 | B2 * | 7/2007 | Hirano et al. .............. 29/25.03 |

FOREIGN PATENT DOCUMENTS

| JP | 02-301116 A | 12/1990 |
| JP | 2003-059338 A | 2/2003 |
| JP | 2004-158580 A | 6/2004 |
| JP | 2006-128247 A | 5/2006 |
| JP | 2006-156951 A | 6/2006 |
| JP | 2006-294734 A | 10/2006 |

* cited by examiner

*Primary Examiner*—Nguyen T Ha
(74) *Attorney, Agent, or Firm*—Arent Fox LLP (57) ABSTRACT

A solid electrolytic capacitor element includes an anode foil, a solid electrolytic layer, a cathode foil, and a connection portion. The anode foil is composed of valve metal and has at least one through hole passing therethrough in thickness direction thereof. The solid electrolytic layer is made of conductive polymer and is provided on a surface of the anode foil. The cathode foil is provided on a surface of the solid electrolytic layer. The connection portion is provided in the through hole and electrically connects a first solid electrolytic layer and a second solid electrolytic layer, the first solid electrolytic layer being a region of the solid electrolytic layer on one face of the anode foil, the second solid electrolytic layer being another region of the solid electrolytic layer on the other face of the anode foil.

14 Claims, 8 Drawing Sheets

SOLID ELECTROLYTIC CAPACITOR ELEMENT AND SOLID ELECTORLYTIC CAPACITOR

BACKGROUND OF THE INVENTION

1. Field of the Invention

The present invention relates to a solid electrolytic capacitor element and a solid electrolytic capacitor.

2. Description of the Related Art

A functional polymer solid electrolytic capacitor is being noticed because the functional polymer solid electrolytic capacitor is superior to frequency property compared to another electrolytic capacitor. In particular, speeding-up and higher frequency are promoted with respect to the functional polymer solid electrolytic capacitor to be coupled to a CPU (Central Processing Unit) of a personal computer or a server. The solid electrolytic capacitor is a surface-mounted capacitor suitable for a power supply line and is suitable for a decoupling circuit.

Recently, a surface mountable solid electrolytic capacitor is being developed, which has a capacitance of a few hundreds μF, has ESR (Equivalent Series Resistance) of 2 mΩ to 10 mΩ at 100 kHz frequency range, has ESL (Equivalent Series Inductance) of approximately 1 pH at 10 MHz range. Japanese Patent Application Publication No. 2006-156951 and Japanese Patent Application Publication No. 2006-128247 disclose a high capacitance solid electrolytic capacitor having more than one solid electrolytic capacitor element.

There is a demand for higher capacitance and lower ESR of the functional polymer solid electrolytic capacitor.

SUMMARY OF THE INVENTION

The present invention has been made in view of the above circumstances, and provides a solid electrolytic capacitor element and a solid electrolytic capacitor having low ESR.

According to an aspect of the present invention, there is provided a solid electrolytic capacitor element including an anode foil, a solid electrolytic layer, a cathode layer, and a connection portion. The anode foil is composed of valve metal and has at least one through hole passing therethrough in thickness direction thereof. The solid electrolytic layer is made of conductive polymer and is provided on a surface of the anode foil. The cathode foil is provided on a surface of the solid electrolytic layer. The connection portion is provided in the through hole and electrically connects a first solid electrolytic layer and a second solid electrolytic layer. The first solid electrolytic layer is a region of the solid electrolytic layer on one face of the anode foil. The second solid electrolytic layer is another region of the solid electrolytic layer on the other face of the anode foil.

With the structure, the first solid electrolytic layer is electrically connected to the second solid electrolytic layer via the through hole. A cathode-extracting distance from regions of the first solid electrolytic layer to a first cathode layer or a cathode-extracting distance from regions of the second solid electrolytic layer to a second cathode layer is reduced, the first cathode layer being a region of the cathode layer on the other face of the anode foil, the second cathode layer being another region of the cathode layer on the one face of the anode foil. The ESR is therefore reduced, even if either the first cathode layer or the second cathode layer is used as a cathode-extracting terminal.

According to another aspect of the present invention, there is provided a solid electrolytic capacitor including a solid electrolytic capacitor element. The solid electrolytic capacitor element has an anode foil, a solid electrolytic layer, a cathode foil, and a connection portion. The anode foil is composed of valve metal and has at least one through hole passing therethrough in thickness direction thereof. The solid electrolytic layer is made of conductive polymer and is provided on a surface of the anode foil. The cathode foil is provided on a surface of the solid electrolytic layer. The connection portion is provided in the through hole and electrically connects a first solid electrolytic layer and a second solid electrolytic layer. The first solid electrolytic layer is a region of the solid electrolytic layer on one face of the anode foil. The second solid electrolytic layer is another region of the solid electrolytic layer on the other face of the anode foil.

With the structure, the first solid electrolytic layer is electrically connected to the second solid electrolytic layer via the through hole. A cathode-extracting distance from regions of the first solid electrolytic layer to a first cathode layer or a cathode-extracting distance from regions of the second solid electrolytic layer to a second cathode layer is reduced, the first cathode layer being a region of the cathode layer on the other face of the anode foil, the second cathode layer being another region of the cathode layer on the one face of the anode foil. The ESR is therefore reduced, even if either the first cathode layer or the second cathode layer is used as a cathode-extracting terminal.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1A:
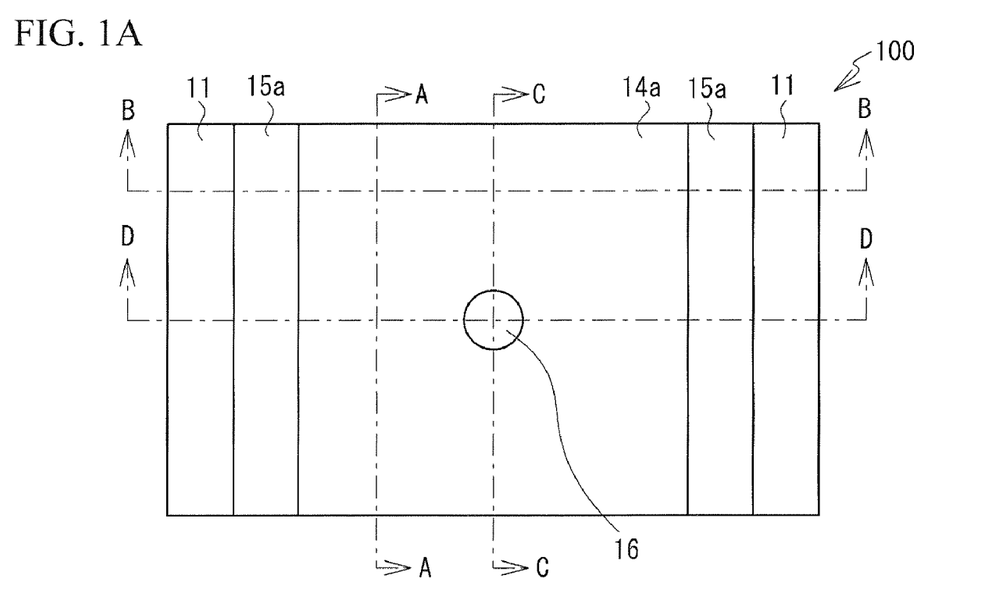
FIG. 1A through FIG. 1E illustrate a solid electrolytic capacitor element in accordance with a first embodiment.
Figure 1B:
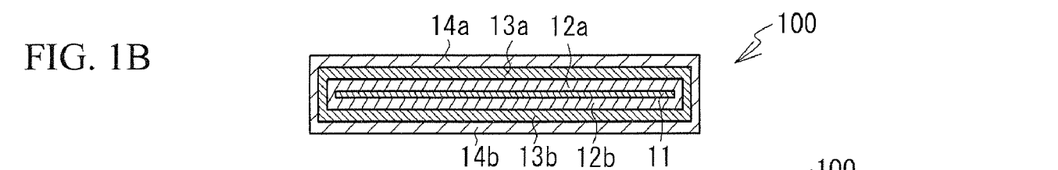
Figure 1C:
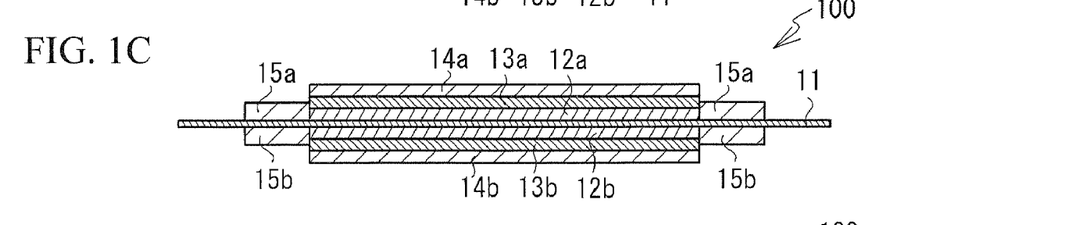
Figures 1D, 1E:
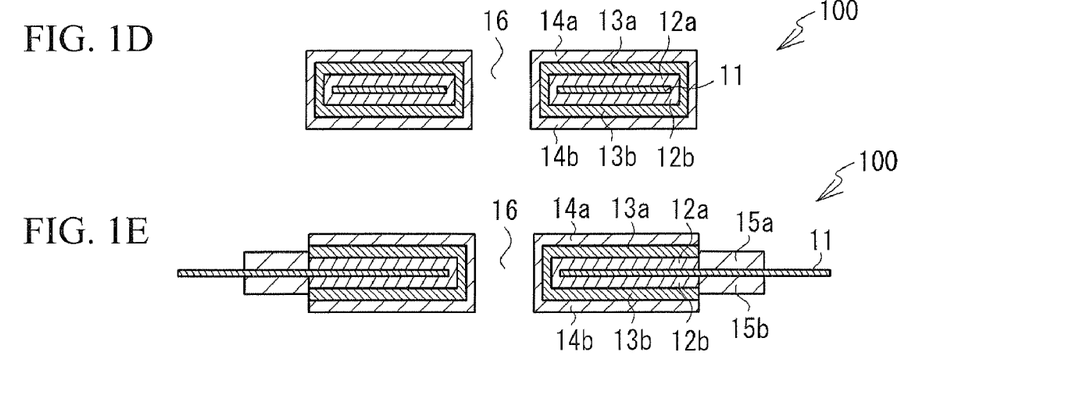

FIG. 1A through FIG. 1E illustrate a solid electrolytic capacitor element 100 in accordance with a first embodiment. FIG. 1A illustrates a top view of the solid electrolytic capacitor element 100. FIG. 1B illustrates a cross sectional view taken along a line A-A of FIG. 1A. FIG. 1C illustrates a cross sectional view taken along a line B-B of FIG. 1A. FIG. 1D illustrates a cross sectional view taken along a line C-C of FIG. 1A. FIG. 1E illustrates a cross sectional view taken along a line D-D of FIG. 1A.

As shown in FIG. 1B and FIG. 1C, the solid electrolytic capacitor element 100 has a structure in which a solid electrolytic layer 12, a carbon paste layer 13, and a cathode layer 14 are provided on a whole surface of an anode foil 11. A region of the solid electrolytic layer 12 on one face of the anode foil 11 is referred to as a solid electrolytic layer 12a, and another region of the solid electrolytic layer 12 on the other face of the anode foil 11 is referred to as a solid electrolytic layer 12b. A region of the carbon paste layer 13 on the one face of the anode foil 11 is referred to as a carbon paste layer 13a, and another region of the carbon paste layer 13 on the other face of the anode foil 11 is referred to as a carbon paste layer 13b. A region of the cathode layer 14 on the one face of the anode foil 11 is referred to as a cathode layer 14a, and another region of the cathode layer 14 on the other face of the anode foil 11 is referred to as a cathode layer 14b.

The anode foil 11 is made of valve metal having a dielectric oxide coating (not illustrated) formed on a surface thereof. The valve metal used for the anode foil 11 may be a metal such as aluminum. The dielectric oxide coating is formed when the surface of the valve metal is subjected to an etching treatment and a chemical oxidation treatment. The solid electrolytic layers 12a and 12b are made of conductive polymer. For example, the solid electrolytic layers 12a and 12b may be made of PEDT (3, 4-polyethylenedioxythiophene) or the like. The carbon paste layers 13a and 13b are made of carbon paste. The cathode layers 14a and 14b are made of conductive material such as silver paste.

As shown in FIG. 1B, the solid electrolytic layer 12a is connected to the solid electrolytic layer 12b with solid electrolyte, the carbon paste layer 13a is connected to the carbon paste layer 13b with carbon paste, and the cathode layer 14a is connected to the cathode layer 14b with conductive material such as silver paste, at both ends of the anode foil 11 in the line A-A direction shown in FIG. 1A.

As shown in FIG. 1A and FIG. 1C, the solid electrolytic layers 12a and 12b, the carbon paste layers 13a and 13b and the cathode layers 14a and 14b are not provided at both ends of the anode foil 11 in the line B-B direction shown in FIG. 1B. Regions at both ends of the anode foil 11 in the line B-B direction shown in FIG. 1B act as an anode-extracting portion. An insulating layer 15a is formed on an exposed region of the solid electrolytic layer 12a, and an insulating layer 15b is formed on an exposed region of the solid electrolytic layer 12b, at both ends of the anode foil 11 in the line B-B direction shown in FIG. 1B. Consequently, leakage of the solid electrolyte from the solid electrolytic layers 12a and 12b is restrained. The insulating layers 15a and 15b are made of insulating synthetic resin such as silicon resin, epoxy resin, polyamide resin, or polyimide resin.

As shown in FIG. 1A, FIG. 1D and FIG. 1E, a through hole 16 passing through the anode foil 11 in a thickness direction thereof is formed, at a region of the anode foil 11 where the solid electrolytic layers 12a and 12b are formed. The solid electrolytic layer 12a is connected to the solid electrolytic layer 12b with solid electrolyte, the carbon paste layer 13a is connected to the carbon paste layer 13b with carbon paste, and the cathode layer 14a is connected to the cathode layer 14b with conductive material such as silver paste, in the through hole 16. A diameter of the through hole 16 is, for example, 1 mm to 2 mm. The area of the through hole 16 is 1% to 3% of an area of the anode foil 11 where the solid electrolytic layers 12a and 12b are formed.

In the embodiment, the solid electrolytic layer 12a is electrically connected to the solid electrolytic layer 12b via the through hole 16. This results in reduction of a cathode-extracting distance from each region of the solid electrolytic layer 12a to the cathode layer 14b. This is because a distance from a region of the solid electrolytic layer 12a near the through hole 16 to the cathode layer 14b via the through hole 16 is smaller than that from the region of the solid electrolytic layer 12a near the through hole 16 to the cathode layer 14b via the end of the anode foil 11. An electrical resistance is therefore reduced between the solid electrolytic layer 12a and the cathode layer 14b, if the cathode layer 14b is used as a cathode-extracting terminal. This results in reduction of ESR. The ESR is reduced if the cathode layer 14a is used as a cathode-extracting terminal. It is preferable that the through hole 16 is formed at center of the region of the anode foil 11 where the solid electrolytic layers 12a and 12b are formed, because the cathode-extracting distance is reduced.

The number of the through hole 16 may be more than one. The ESR is reduced when the solid electrolytic layer 12a is electrically connected to the solid electrolytic layer 12b via the through hole 16. Therefore, it is not necessary that the carbon paste layer 13a is connected to the carbon paste layer 13b, and the cathode layer 14a is not connected to the cathode layer 14b, in the through hole 16. However, the electrical resistance is reduced when the carbon paste layer 13a is connected to the carbon paste layer 13b. This results in more reduction of the ESR. The electrical resistance is more reduced if the cathode layer 14a is connected to the cathode layer 14b. This results in more reduction of the ESR.

The anode foil 11 is formed, when valve metal having a dielectric oxide coating is cut off into a given shape and a through hole is formed. With the cutting process and the penetrating process, the valve metal is exposed at an end face of the anode foil 11 and in the through hole. And defect of the dielectric oxide coating is occurred. It is therefore necessary to form an oxide coating on the exposed valve metal again. For example, the dielectric oxide coating may be formed on the exposed valve again, when a chemical conversion treatment and a thermal treatment are performed several times after the cutting process and the penetrating process. This chemical conversion treatment uses chemical conversion solution having an adipic acid ammonium concentration of 0.5 weight % to 2 weight %, and is performed with a voltage near a formation voltage of the dielectric oxide coating. The thermal treatment is performed in a temperature range of 200 degrees C. to 280 degrees C.

The solid electrolytic layers 12a and 12b are formed when polymerizable monomer is polymerized with oxidizer. Solvent used for the polymerization is a mixed solvent including polymerizable monomer and volatile solvent. Concentration of the monomer in the mixed solvent is preferably 1 wt % to 50 wt %, and is more preferably 10 wt % to 35 wt %. The oxidizer is alcohol-based solvent including oxidizer of 40 wt % to 60 wt %. The solid electrolytic layer may be formed on the anode foil 11 after the polymerizable monomer and the oxidizer are mixed (single liquid method). The solid electrolytic layer may be formed after the polymerizable monomer and the oxidizer are provided to the anode foil 11 separately (double liquid method).

Polypyrrole in which pyrrole is electropolymerized may be used as the solid electrolytic layers 12a and 12b. With the polypyrrole, thickness of the solid electrolytic layers 12a and 12b may be even. It is therefore possible to restrain a damage of the dielectric oxide coating of the anode foil 11 and is possible to reduce LC (leakage of current).

In the embodiment, the solid electrolytic layer 12a corresponds to the first solid electrolytic layer, the solid electrolytic layer 12b corresponds to the second solid electrolytic layer, the cathode layer 14a corresponds to the first cathode layer, the cathode layer 14b corresponds to the second cathode layer, the solid electrolyte electrically connecting the solid electrolytic layer 12a and the solid electrolytic layer 12b in the through hole 16 corresponds to the connection portion, the conductive material electrically connecting the cathode layer 14a and the cathode layer 14b corresponds to the electrode of the connection portion.

Second Embodiment

Figures 2A, 2B:
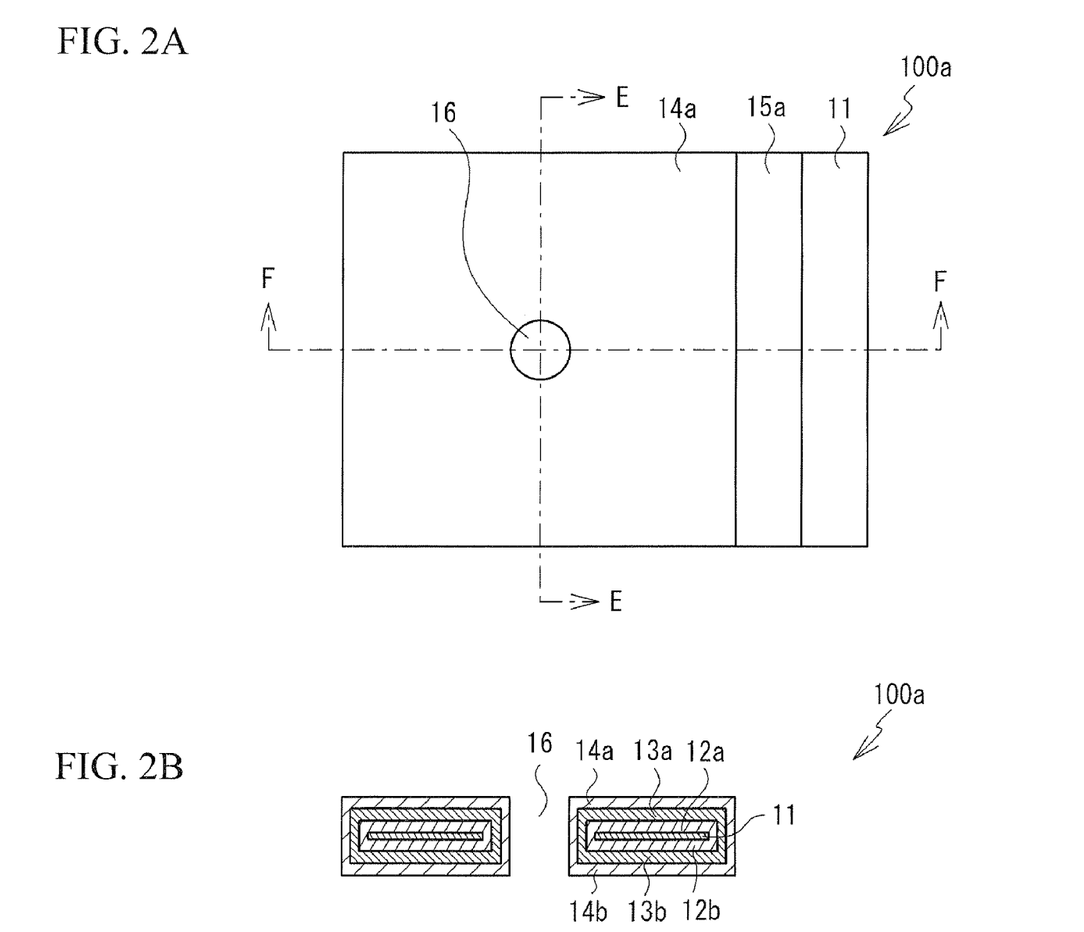
FIG. 2A through FIG. 2C illustrate a solid electrolytic capacitor element in accordance with a second embodiment.
Figure 2C:
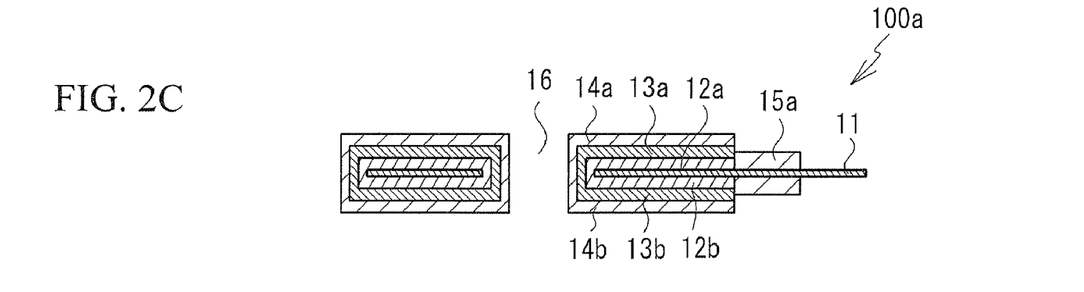

Next, a description will be given of a solid electrolytic capacitor element 10a in accordance with a second embodiment. FIG. 2A through FIG. 2C illustrate the solid electrolytic capacitor element 100a. FIG. 2A illustrates a top view of the solid electrolytic capacitor element 100a. FIG. 2B illustrates a cross sectional view taken along a line E-E of FIG. 2A. FIG. 2C illustrates a cross sectional view taken along a line F-F of FIG. 2A.

The solid electrolytic capacitor element 100a has a single cathode-extracting portion from the anode foil 11, being different from the solid electrolytic capacitor element 100 shown in FIG. 1A. The solid electrolytic layers 12a and 12b, the carbon paste layers 13a and 13b and the cathode layers 14a and 14b are not provided at one of the end portions of the anode foil 11 in the line F-F direction shown in FIG. 2A. On the other hand, the solid electrolytic layer 12a is connected to the solid electrolytic layer 12b with solid electrolyte, the carbon paste layer 13a is connected to the carbon paste layer 13b with carbon paste, and the cathode layer 14a is connected to the cathode layer 14b with conductive material such as silver paste, at the other end portion of the anode foil 11 in the line F-F direction shown in FIG. 2A.

In the embodiment, the solid electrolytic layer 12a is electrically connected to the solid electrolytic layer 12b via the through hole 16. This results in reduction of the ESR of the solid electrolytic capacitor element 100a.

Third Embodiment

Figure 3A:
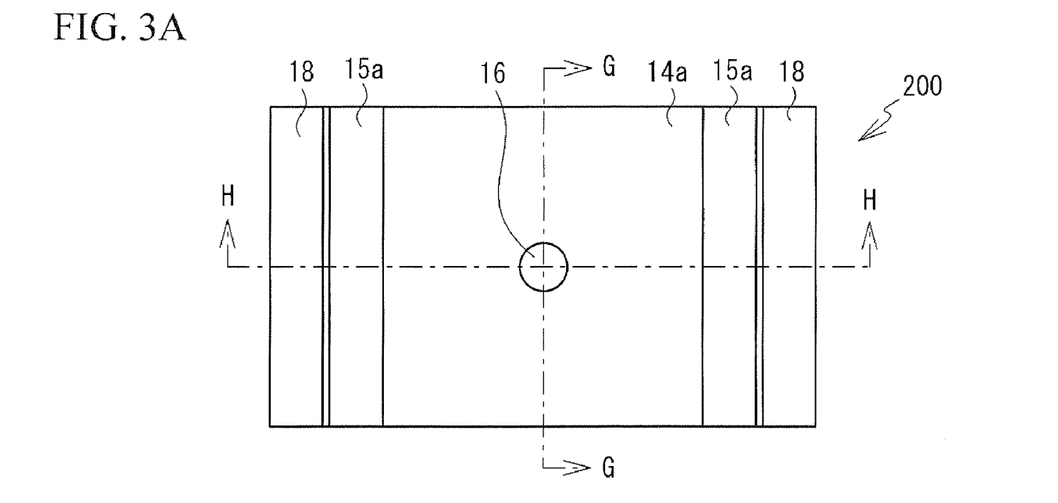
FIG. 3A through FIG. 3C illustrate a solid electrolytic capacitor element in accordance with a third embodiment.
Figure 3B:
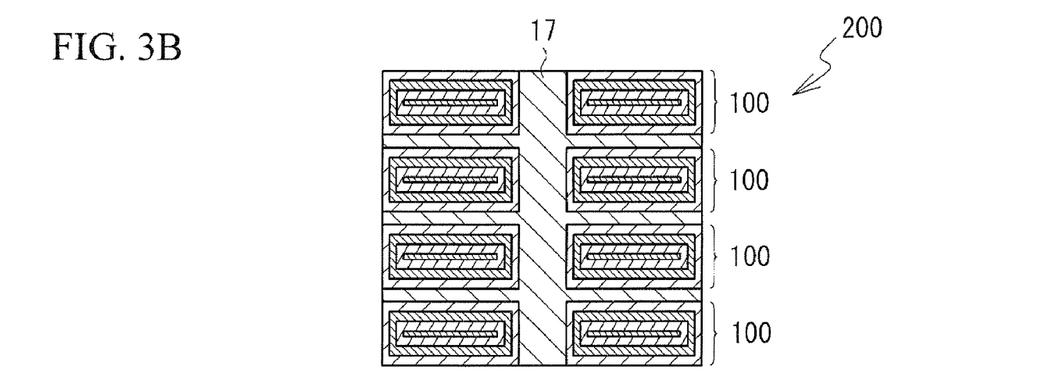
Figure 3C:
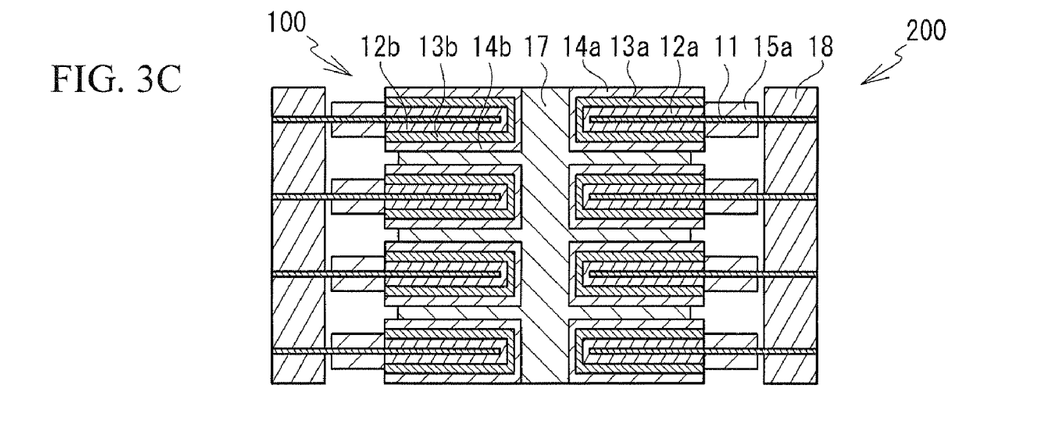

Next, a description will be given of a solid electrolytic capacitor element 200 in accordance with a third embodiment. FIG. 3A through FIG. 3C illustrate the solid electrolytic capacitor element 200. FIG. 3A illustrates a top view of the solid electrolytic capacitor element 200. FIG. 3B illustrates a cross sectional view taken along a line G-G of FIG. 3A. FIG. 3C illustrates a cross sectional view taken along a line H-H of FIG. 3A.

As shown in FIG. 3B and FIG. 3C, the solid electrolytic capacitor element 200 has a structure in which a plurality of the solid electrolytic capacitor elements 100 are stacked. In the solid electrolytic capacitor element 200, each of the solid electrolytic capacitor elements 100 is adhered to each other with a conductive adhesive agent 17 so that the cathode layer 14a of one solid electrolytic capacitor element 100 faces with the cathode layer 14b of another solid electrolytic capacitor element 100. The conductive adhesive agent 17 is made of metal grains such as silver and thermoset resin. Each of the through holes 16 is filled with the conductive adhesive agent 17.

As shown in FIG. 3A and FIG. 3C, each of the anode foils 11 is connected to each other via a strip-shaped metal board 18 with welding or the like. As shown in FIG. 3B and FIG. 3C, each of the through holes 16 is communicated with each other.

A cathode-extracting distance from regions of each solid electrolytic layers 12a and 12b to a bottom cathode layer 14b or a top cathode layer 14a is reduced in the embodiment. The ESR is therefore reduced in the solid electrolytic capacitor element 200. It is possible to optionally change a capacitance of the solid electrolytic capacitor element 200 by changing the number of the solid electrolytic capacitor element 100.

Fourth Embodiment

Figure 4A:
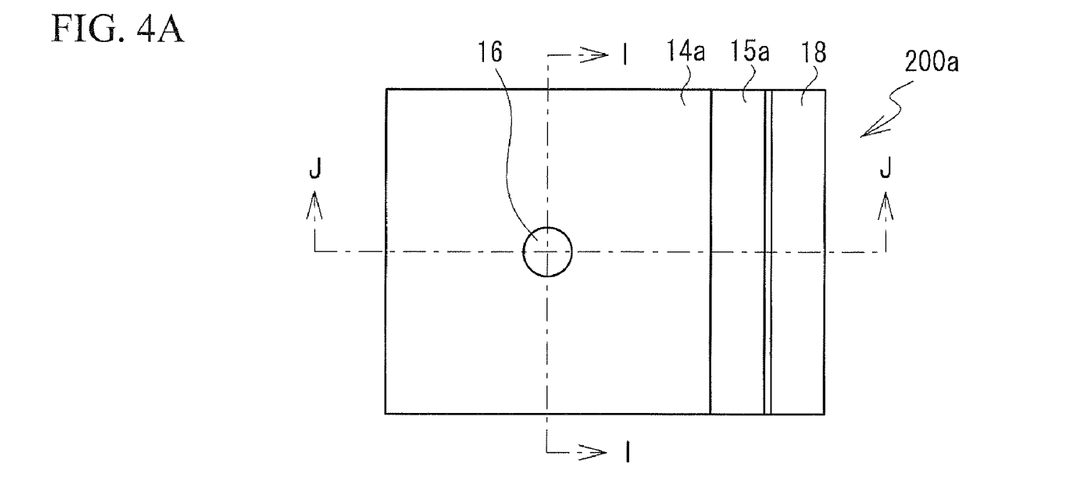
FIG. 4A through FIG. 4C illustrate a solid electrolytic capacitor element in accordance with a fourth embodiment.
Figure 4B:
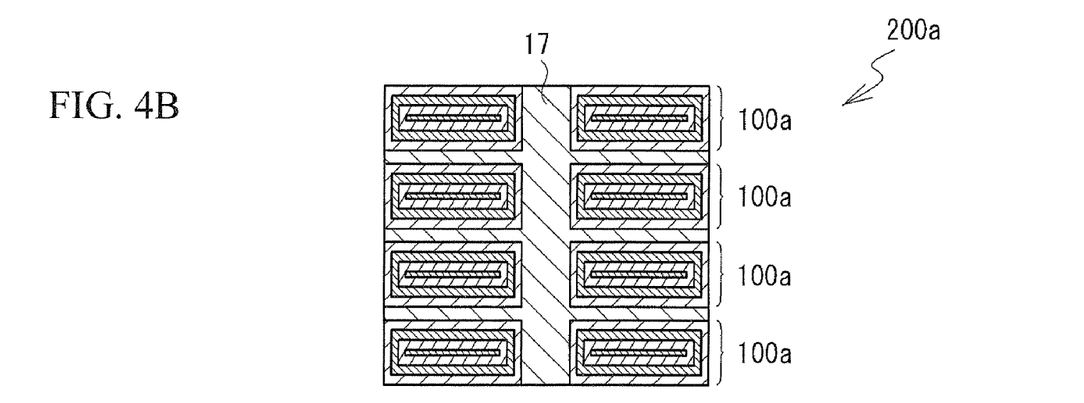
Figure 4C:
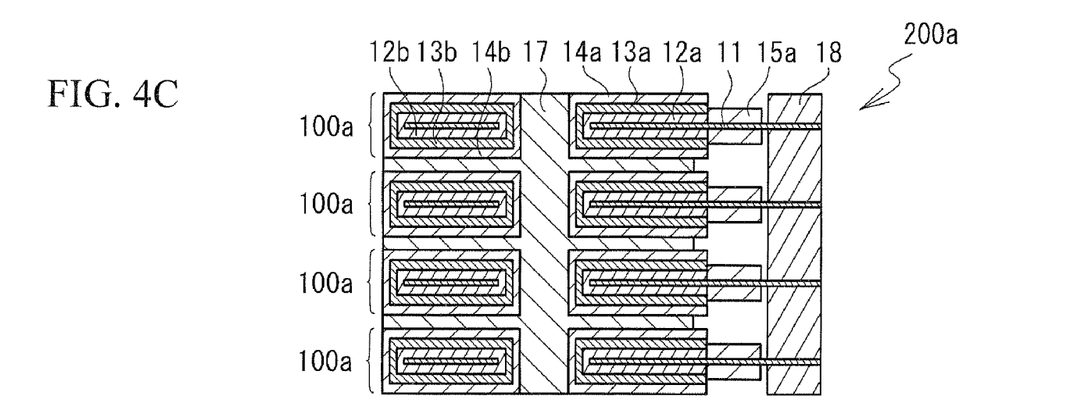

Next, a description will be given of a solid electrolytic capacitor element 200a in accordance with a fourth embodiment. FIG. 4A through FIG. 4C illustrate the solid electrolytic capacitor element 200a. FIG. 4A illustrates a top view of the solid electrolytic capacitor element 200a. FIG. 4B illustrates a cross sectional view taken along a line I-I of FIG. 4A. FIG. 4C illustrates a cross sectional view taken along a line J-J of FIG. 4C.

As shown in FIG. 4B and FIG. 4C, the solid electrolytic capacitor element 200a has a structure in which a plurality of the solid electrolytic capacitor elements 100a are stacked. In the solid electrolytic capacitor element 200a, each of the solid electrolytic capacitor elements 100a is adhered to each other with the conductive adhesive agent 17 so that the cathode layer 14a of one solid electrolytic capacitor element 100a faces with the cathode layer 14b of another solid electrolytic capacitor element 100a. Each anode-extracting portion of the anode foils 11 is connected to each other with the strip-shaped metal board 18.

A cathode-extracting distance from regions of each solid electrolytic layers 12a and 12b to a bottom cathode layer 14b or a top cathode layer 14a is reduced in the embodiment. The ESR is therefore reduced in the solid electrolytic capacitor element 200a. It is possible to optionally change a capacitance of the solid electrolytic capacitor element 200a by changing the number of the solid electrolytic capacitor element 100a.

Fifth Embodiment

Figure 5A:
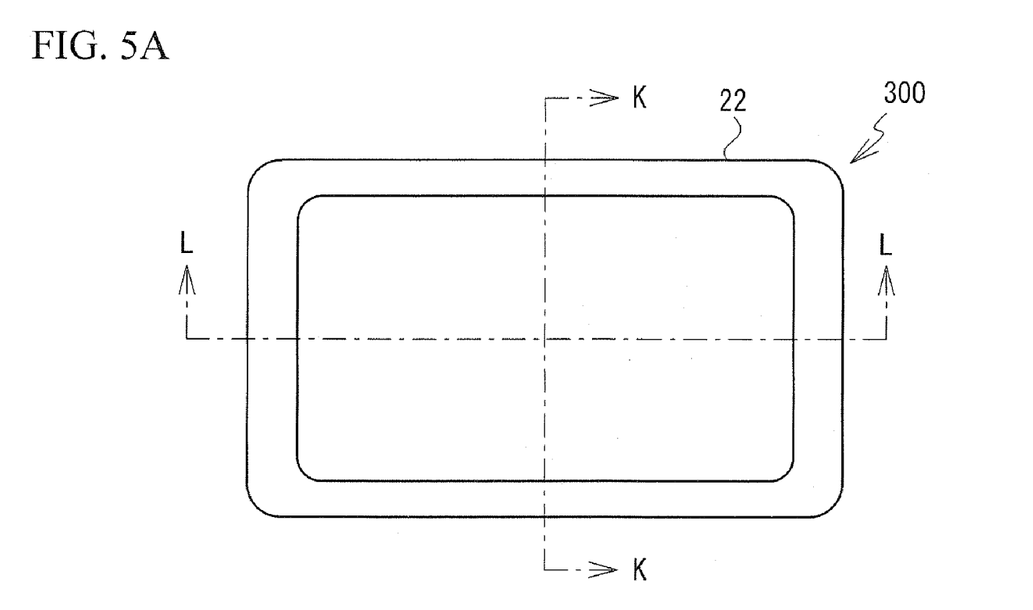
FIG. 5A and FIG. 5B illustrate a solid electrolytic capacitor in accordance with a fifth embodiment.
Figure 5B:
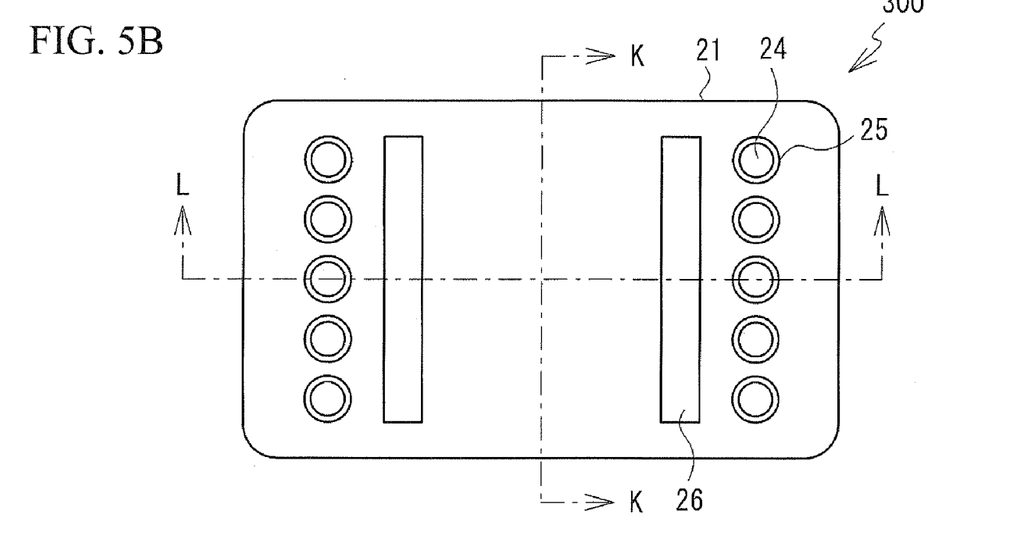
Figure 6A:
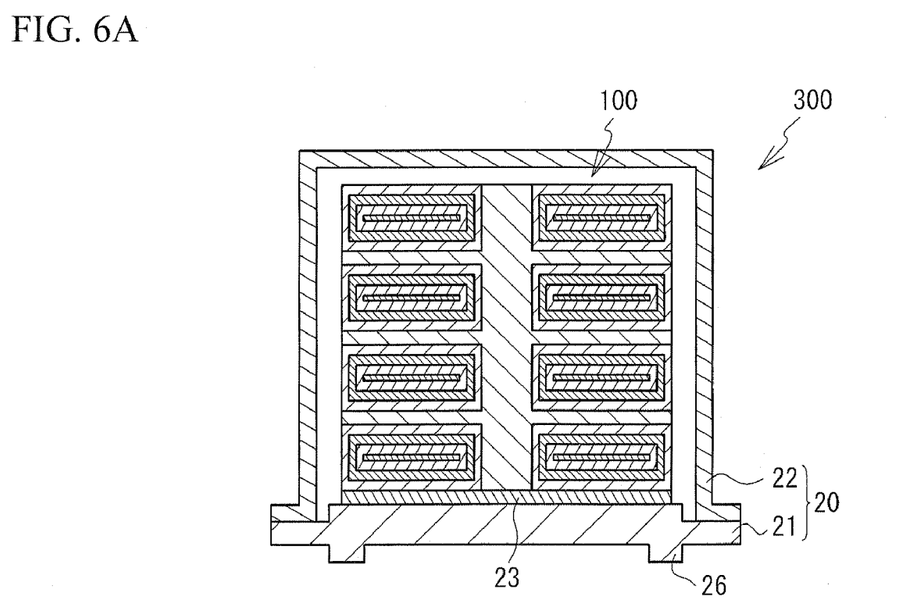
FIG. 6A and FIG. 6B illustrate the solid electrolytic capacitor in accordance with the fifth embodiment.
Figure 6B:
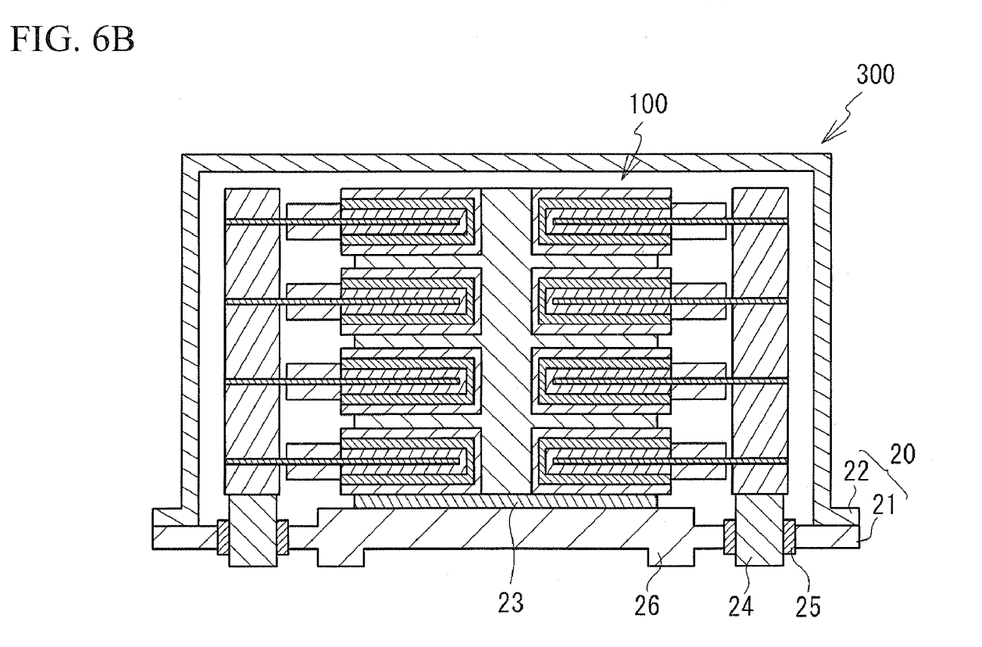

Next, a description will be given of a solid electrolytic capacitor 300 in accordance with a fifth embodiment. FIG. 5A through FIG. 6B illustrate the solid electrolytic capacitor 300. FIG. 5A illustrates a top view of the solid electrolytic capacitor 300. FIG. 5B illustrates a bottom view of the solid electrolytic capacitor 300. FIG. 6A illustrates a cross sectional view taken along a line K-K of FIG. 5A. FIG. 6B illustrates a cross sectional view taken along a line L-L of FIG. 5A.

As shown in FIG. 6A and FIG. 6B, the solid electrolytic capacitor 300 has a structure in which more than one solid electrolytic capacitor element 100 is housed in a case 20. The case 20 has a structure in which a metal cap 22 is provided on a conductive substrate 21. The metal cap 22 may be welded to the conductive substrate 21 with a projection welding. The metal cap 22 is made of metal such as copper, aluminum, SPC steel, cobalt steel, or stainless steel.

The conductive substrate 21 is made of material that has conductivity, is solderable easily, and has low moisture-permeability. For example, the conductive substrate 21 may be made of metal such as copper, aluminum, SPC steel, cobalt steel, stainless steel, ceramics having a metal layer coated on a surface thereof. An insulating layer (not illustrated) is formed on an inner face of the metal cap 22. It is therefore possible to restrain an electrical short between the solid electrolytic capacitor element 100 and the metal cap 22. The insulating layer may be insulating resin, polyamide-based resin, or PET (polyethyleneterephthalate).

As shown in FIG. 6A and FIG. 6B, the cathode layer 14b of a bottom solid electrolytic capacitor element 100 is electrically connected to the conductive substrate 21 via a conductive adhesive agent 23. Therefore, the conductive substrate 21 and the metal cap 22 act as a cathode electrode.

As shown in FIG. 5B and FIG. 6B, a through hole is formed at around both end portions of the conductive substrate 21 in the L-L line direction. An anode terminal 24 is arranged in each of the through holes. An insulating member 25 is formed between the anode terminal 24 and the conductive substrate 21. It is therefore possible to restrain an electrical short between the anode terminal 24 and the conductive substrate 21.

The anode terminal 24 is made of a conductive material that is solderable easily. The anode terminal 24 may be made of SPC steel, cobalt steel or the like. The anode terminal 24 is connected to the anode foil 11. The conductive substrate 21 has a convex portion 26 on a bottom face thereof between both of the through holes. The convex portion 26 acts as a cathode terminal.

The ESR is reduced in the solid electrolytic capacitor 300 in accordance with the embodiment. The solid electrolytic capacitor 300 has high humidity resistance, because the solid electrolytic capacitor element 100 is sealed with the metal cap 22 and the conductive substrate 21 that have high sealing performance and have high blocking performance from outer circumstance. It is therefore possible to restrain degradation of the solid electrolytic capacitor 300. And it is possible to reduce ESL of the solid electrolytic capacitor 300, because the whole of the case 20 acts as a cathode electrode.

Sixth Embodiment

Figure 7A:
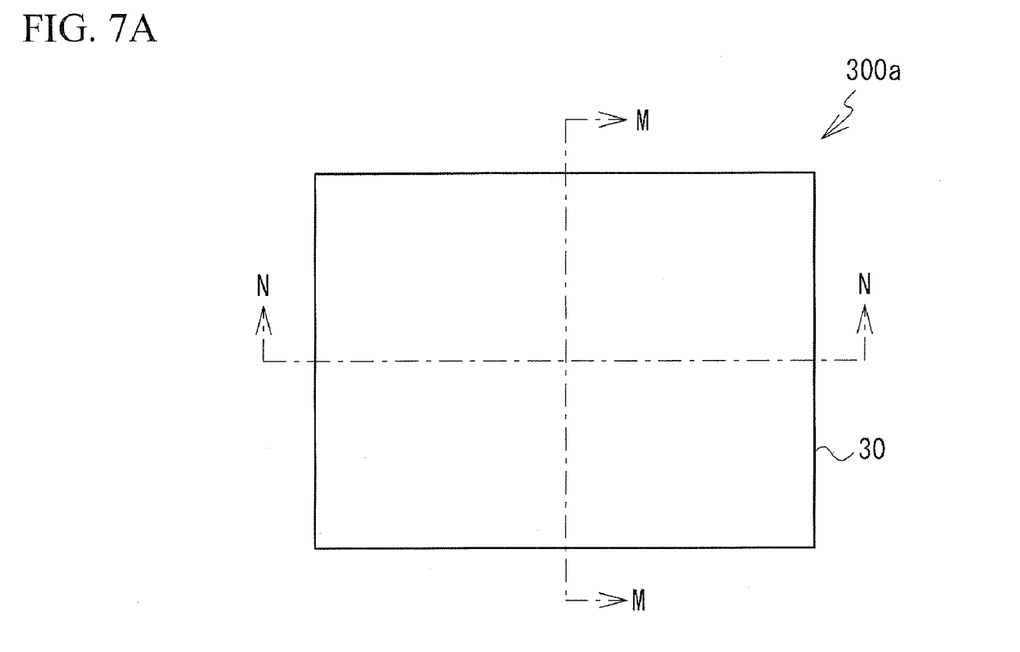
FIG. 7A and FIG. 7B illustrate a solid electrolytic capacitor in accordance with a sixth embodiment.
Figure 7B:
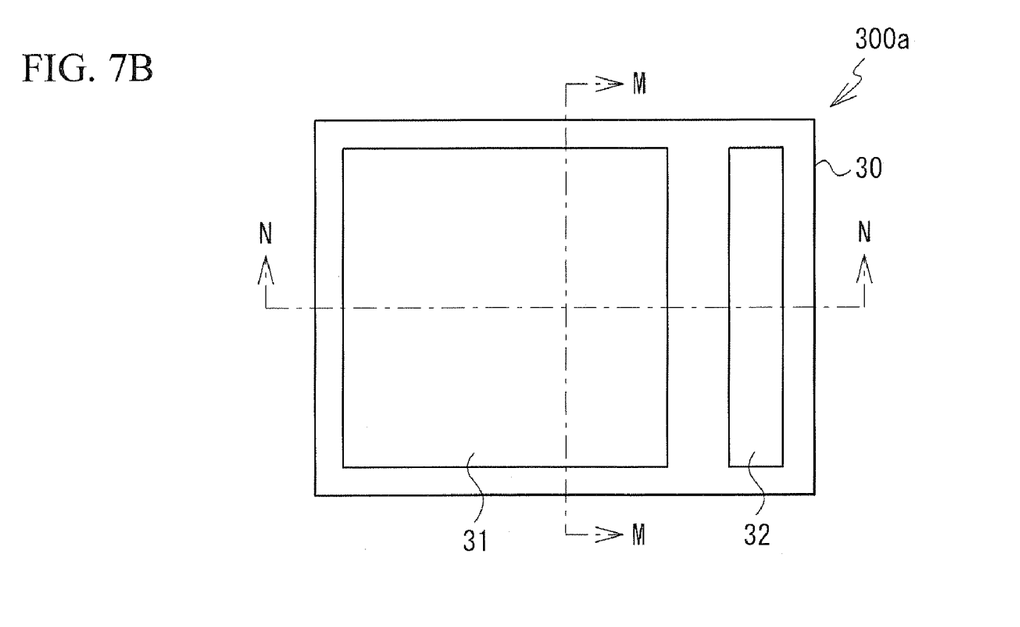
Figure 8A:
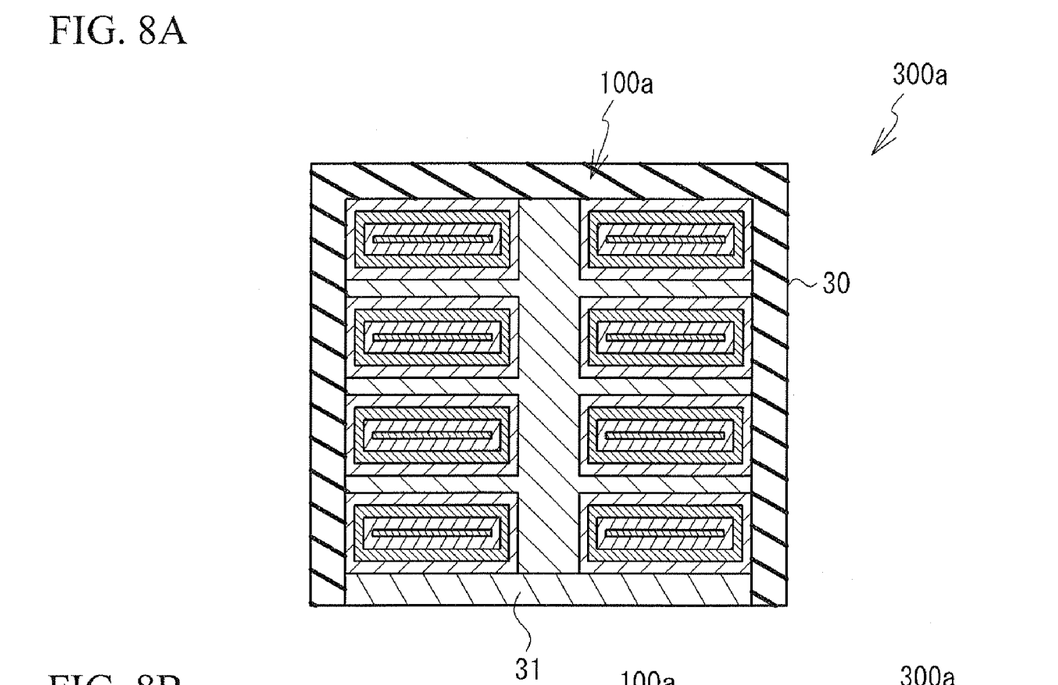
FIG. 8A and FIG. 8B illustrate the solid electrolytic capacitor in accordance with the sixth embodiment.
Figure 8B:
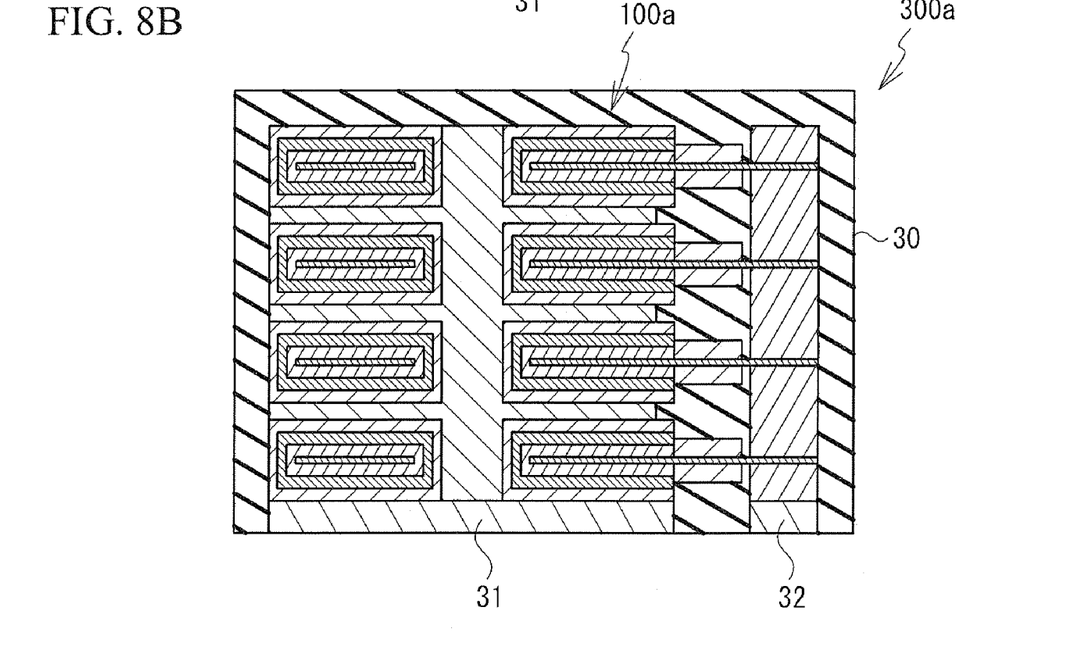

Next, a description will be given of a solid electrolytic capacitor 300a in accordance with a sixth embodiment. FIG. 7A through FIG. 8B illustrate the solid electrolytic capacitor 300a. FIG. 7A illustrates a top view of the solid electrolytic capacitor 300a. FIG. 7B illustrates a bottom view of the solid electrolytic capacitor 300a. FIG. 8A illustrates a cross sectional view taken along a line M-M of FIG. 7A. FIG. 8B illustrates a cross sectional view taken along a line N-N of FIG. 7A.

As shown in FIG. 8A and FIG. 8B, the solid electrolytic capacitor 300a has a structure in which more than one solid electrolytic capacitor element 100a is covered with a thermoset resin 30. As shown in FIG. 7B, FIG. 8A and FIG. 8B, the cathode layer 14b of a bottom solid electrolytic capacitor element 100a is electrically connected to a conductive substrate 31. The conductive substrate 31 is exposed from the thermoset resin 30. Therefore, the conductive substrate 31 acts as a cathode electrode. An anode terminal 32 is connected to the anode foil 11. The anode terminal 32 is exposed from the conductive substrate 31.

The ESR is reduced in the solid electrolytic capacitor 300a in accordance with the embodiment. It is possible to fabricate the solid electrolytic capacitor 300a with low cost, because the solid electrolytic capacitor element 100a is covered with the thermoset resin.

The solid electrolytic capacitor 300a is covered with the thermoset resin in the embodiment. The solid electrolytic capacitor 300a may be covered with the conductive substrate 21 and the metal cap 22 shown in FIG. 5A through FIG. 6B. The solid electrolytic capacitor 300 in accordance with the fifth embodiment is covered with the conductive substrate 21 and the metal cap 22. The solid electrolytic capacitor 300 may be covered with the thermoset resin 30 shown in FIG. 7A through FIG. 8B. The anode foil 11 has one or two anode-extracting portions. The anode foil 11 may have more than two anode-extracting portions.

EXAMPLES

The solid electrolytic capacitor element and the solid electrolytic capacitor in accordance with the above-mentioned embodiments were fabricated.

First Example

The solid electrolytic capacitor element 100 shown in FIG. 1A was fabricated in a first example. The anode foil 11 was formed of an aluminum foil that was subjected to an etching treatment and a chemical conversion treatment and had a size of 15 mm×9.5 mm×110 μm. The solid electrolytic layers 12a and 12b were made of PEDT (3, 4-polyethylenedioxythiophene). The carbon paste layers 13a and 13b were made of carbon paste. The cathode layers 14a and 14b were made of conductive silver paste. A diameter of the through hole 16 was 1 mm. The capacitance of the solid electrolytic capacitor element of the first example was 250 μF.

First Comparative Example

An anode foil having no through hole was used in a first comparative example. The other structure of a solid electrolytic capacitor element of the first comparative example is the same as that of the first example. The capacitance of the solid electrolytic capacitor element of the first comparative example was 250 μF.

First Analysis

Table 1 shows an electrical capacitance, tan δ, leakage current, ESR and impedance Z of the solid electrolytic capacitor elements of the first example and the first comparative example. Thirty solid electrolytic capacitor elements of the first example and first comparative example were respectively fabricated. Each value in Table 1 shows average value thereof.

TABLE 1

| | Electrical capacitance (μF) | tanδ (%) | Leakage Current (μA/2 minutes) | ESR (mΩ) | Z (mΩ) |
|---|---|---|---|---|---|
| First Example | 245 | 0.8 | 38 | 1.2 | 6.5 |
| First Comparative Example | 248 | 1.0 | 34 | 2.8 | 9.7 |

As shown in Table 1, the ESR of the solid electrolytic capacitor element of the first example was lower than that of the first comparative example. This is because the solid electrolytic layer 12a is electrically connected to the solid electrolytic layer 12b via the through hole 16 and the cathode-extracting distance was reduced. In addition, the impedance of the solid electrolytic capacitor element of the first example was lower than that of the first comparative example.

Second Example

The solid electrolytic capacitor 300 shown in FIG. 3A was fabricated in a second example. The anode foil 11 was formed of an aluminum foil that was subjected to an etching treatment and a chemical conversion treatment and had a size of 15 mm×9.5 mm×110 μm. The solid electrolytic layers 12a and 12b were made of PEDT (3, 4-polyethylenedioxythiophene). The carbon paste layers 13a and 13b were made of carbon paste. The cathode layers 14a and 14b were made of conductive silver paste. The conductive adhesive agent 17 was made of adhesive silver paste. A diameter of the through hole 16 was 1 mm. The number of the solid electrolytic capacitor element 100 shown in FIG. 1A was four, in the solid electrolytic capacitor of the second example. The capacitance of the solid electrolytic capacitor element of the second example was 1000 µF.

Second Comparative Example

An anode foil having no through hole was used in a second comparative example. The other structure of a solid electrolytic capacitor of the second comparative example is the same as that of the second example. The capacitance of the solid electrolytic capacitor of the second comparative example was 1000 µF.

Second Analysis

Table 2 shows an electrical capacitance, tan δ, leakage current, ESR and impedance Z of the solid electrolytic capacitors of the second example and the second comparative example. Thirty solid electrolytic capacitors of the second example and the second comparative example were respectively fabricated. Each value in Table 2 shows average value thereof.

TABLE 2

|  | Electrical capacitance (µF) | tanδ (%) | Leakage Current (µA/2 minutes) | ESR (mΩ) | Z (mΩ) |
|---|---|---|---|---|---|
| Second Example | 975 | 0.8 | 154 | 0.7 | 4.3 |
| Second Comparative Example | 987 | 1.0 | 147 | 1.1 | 5.8 |

As shown in Table 2, the ESR of the solid electrolytic capacitor of the second example was lower than that of the second comparative example. This is because the solid electrolytic layer 12a is electrically connected to the solid electrolytic layer 12b via the through hole 16 and the cathode-extracting distance was reduced. In addition, the impedance of the solid electrolytic capacitor element of the second example was lower than that of the second comparative example.

Third Example

The solid electrolytic capacitor 300 shown in FIG. 5A was fabricated in a third example. The anode foil 11 was formed of an aluminum foil that was subjected to an etching treatment and a chemical conversion treatment and had a size of 15 mm×9.5 mm×110 µm. The solid electrolytic layers 12a and 12b were made of PEDT (3, 4-polyethylenedioxythiophene). The carbon paste layers 13a and 13b were made of carbon paste. The cathode layers 14a and 14b were made of conductive silver paste. The conductive adhesive agent 17 was made of adhesive silver paste. The metal cap 22 was welded to the conductive substrate 21 with a projection welding. Thus, the solid electrolytic capacitor element was sealed. A diameter of the through hole 16 was 1 mm. The number of the solid electrolytic capacitor element 100 shown in FIG. 1A was four, in the solid electrolytic capacitor of the third example. The capacitance of the solid electrolytic capacitor element of the third example was 1000 µF.

Third Comparative Example

An anode foil having no through hole was used in a third comparative example. The other structure of a solid electrolytic capacitor of the third comparative example is the same as that of the third example. The capacitance of the solid electrolytic capacitor of the third comparative example was 1000 µF.

Third Analysis

Table 3 shows an electrical capacitance, tan δ, leakage current, ESR and impedance Z of the solid electrolytic capacitors of the third example and the third comparative example. Thirty solid electrolytic capacitors of the third example and the third comparative example were respectively fabricated. Each value in Table 3 shows average value thereof.

TABLE 3

|  | Electrical capacitance (µF) | tanδ (%) | Leakage Current (µA/2 minutes) | ESR (mΩ) | Z (mΩ) |
|---|---|---|---|---|---|
| Third Example | 975 | 0.8 | 164 | 1.5 | 2.1 |
| Third Comparative Example | 987 | 1.0 | 158 | 1.9 | 2.6 |

As shown in Table 3, the ESR of the solid electrolytic capacitor of the third example was lower than that of the third comparative example. This is because the solid electrolytic layer 12a is electrically connected to the solid electrolytic layer 12b via the through hole 16 and the cathode-extracting distance was reduced. In addition, the impedance of the solid electrolytic capacitor of the third example was lower than that of the third comparative example.

While the above description constitutes the preferred embodiments of the present invention, it will be appreciated that the invention is susceptible of modification, variation and change without departing from the proper scope and fair meaning of the accompanying claims.

The present application is based on Japanese Patent Application No. 2007-070290 filed Mar. 19, 2007, the entire disclosure of which is hereby incorporated by reference.

What is claimed is:

1. A solid electrolytic capacitor element comprising:
   an anode foil that is composed of valve metal and has at least one through hole passing therethrough in thickness direction thereof;
   a solid electrolytic layer that is made of conductive polymer and is provided on a surface of the anode foil;
   a cathode foil that is provided on a surface of the solid electrolytic layer; and
   a connection portion that is provided in the through hole and electrically connects a first solid electrolytic layer and a second solid electrolytic layer,
   the first solid electrolytic layer being a region of the solid electrolytic layer on one face of the anode foil,
   the second solid electrolytic layer being another region of the solid electrolytic layer on the other face of the anode foil.

2. The solid electrolytic capacitor element as claimed in claim 1, wherein the connection portion has solid electrolyte that connects the first solid electrolytic layer and the second solid electrolytic layer.

3. The solid electrolytic capacitor element as claimed in claim 1, wherein the connection portion has an electrode that connects a first cathode layer and a second cathode layer, the first cathode layer being a region of the cathode layer above the one face of the anode foil, the second cathode layer being a region of the cathode layer above the other face of the anode foil.

4. A solid electrolytic capacitor comprising a solid electrolytic capacitor element, the solid electrolytic capacitor element having an anode foil, a solid electrolytic layer, a cathode foil, and a connection portion, the anode foil being composed of valve metal and having at least one through hole that passes therethrough in thickness direction thereof, the solid electrolytic layer being made of conductive polymer and being provided on a surface of the anode foil, the cathode foil being provided on a surface of the solid electrolytic layer, the connection portion being provided in the through hole and electrically connecting a first solid electrolytic layer and a second solid electrolytic layer, the first solid electrolytic layer being a region of the solid electrolytic layer on one face of the anode foil, the second solid electrolytic layer being another region of the solid electrolytic layer on the other face of the anode foil.

5. The solid electrolytic capacitor as claimed in claim 4, wherein the solid electrolytic capacitor element is covered with thermoset resin.

6. The solid electrolytic capacitor as claimed in claim 4 further comprising:

a conductive substrate that has a cathode terminal and is electrically connected to the cathode layer, the solid electrolytic capacitor element being mounted on the conductive substrate;

a metal cap that is connected to the conductive substrate and covers the solid electrolytic capacitor element.

7. The solid electrolytic capacitor as claimed in claim 6, wherein:

the conductive substrate has at least one through hole; and the solid electrolytic capacitor element has an anode terminal extracted from the anode foil through the through hole.

8. The solid electrolytic capacitor as claimed in claim 6 further comprising an insulating member between the conductive substrate and the anode terminal in the through hole.

9. The solid electrolytic capacitor as claimed in claim 4, wherein:

the solid electrolytic capacitor has a plurality of the solid electrolytic capacitor elements; and the solid electrolytic capacitor elements are stacked on each other.

10. The solid electrolytic capacitor as claimed in claim 9, wherein a pair of the cathode layers facing with each other is adhered to each other with a conductive adhesive agent.

11. The solid electrolytic capacitor as claimed in claim 10, wherein the adhesive agent includes a metal grain and thermoset resin.

12. The solid electrolytic capacitor as claimed in claim 9, wherein each through hole of the solid electrolytic capacitor elements is communicated with each other.

13. The solid electrolytic capacitor as claimed in claim 9, wherein the through hole is filled with conductive adhesive agent.

14. The solid electrolytic capacitor as claimed in claim 9, wherein:

each anode foil of the solid electrolytic capacitor elements has an anode-extracting portion; and each anode-extracting portion is coupled to each other.

* * * * *

UNITED STATES PATENT AND TRADEMARK OFFICE
CERTIFICATE OF CORRECTION

| | | |
|---|---|---|
| PATENT NO. | : 7,843,681 B2 | Page 1 of 1 |
| APPLICATION NO. | : 12/051698 | |
| DATED | : November 30, 2010 | |
| INVENTOR(S) | : Hidetoshi Ishizuka et al. | |

It is certified that error appears in the above-identified patent and that said Letters Patent is hereby corrected as shown below:

Title Page: and Col. 1

In (54) Title, please correct the Title to read as follows:

(54) SOLID ELECTROLYTIC CAPACITOR ELEMENT AND SOLID ELECTROLYTIC CAPACITOR

Signed and Sealed this
First Day of March, 2011

David J. Kappos
*Director of the United States Patent and Trademark Office*